Nov. 11, 1969  H. J. ENGELSHER ET AL  3,477,686
ADJUSTABLE SHUT-OFF VALVE
Filed July 20, 1964

INVENTORS
HARVEY J. ENGELSHER
ROBERT W. McKIRDY

BY
Irving Seidman
ATTORNEY.

United States Patent Office 3,477,686
Patented Nov. 11, 1969

3,477,686
ADJUSTABLE SHUT-OFF VALVE
Harvey J. Engelsher, Yonkers, and Robert W. McKirdy, Scarsdale, N.Y., assignors, by direct and mesne assignments, to Horizon Industries, Ltd., a corporation of New York
Filed July 20, 1964, Ser. No. 383,880
Int. Cl. F16l 55/14; F16g 11/06, 11/00
U.S. Cl. 251—10                                      3 Claims

ABSTRACT OF THE DISCLOSURE

An adjustable shut-off valve for selectively controlling the flow rate of a fluid through resilient tubing.

---

This invention relates to a device for stopping or starting the flow of fluids or gases in a tubular conduit, or alternatively, controlling their flow-rate by varying the size of the tube lumen.

The object of this valve is to provide manually or mechanically continuously adjustable flow control of a fluid or a gas and at the same time provide the operator with a means of stopping the flow instantaneously irrespective of the rate of flow at the moment absolute shutdown becomes necessary. This valve also provides the operator with instantaneous recourse to the exact "open" position to which the valve was adjusted before shutdown.

In the drawings illustrating the invention

This invention is intended primarily for use in conjunction with apparatus used for dispensing fluid to a patient by a suitable intravenous route. In such application, it may become necessary to arrest the intravenous flow instantaneously, a procedure which is not presently possible where a wide range of flow, say from 1 minim to several cc. a minute is controlled by gradual vernier movement of the valve component. However, we have so designed this valve mechanism that when the valve lever plate component is in the open position thereof, a vernier control screw may be rotated clockwise or counter-clockwise thereby decreasing or increasing respectively the size of the tube opening through which the liquid is flowing. Furthermore, pivotable movement of the lever plate component to a position relative to and in engagement with a spring-like tongue element causes said tongue to move against the outer wall of the flexible and transparent tube, pressing it tightly against a rigid plate and closing it completely. After such an instantaneous closing, it is often desirable to restore the flow in the tube to its preset rate as established by the position of the vernier control screw. This is achieved by pivotably moving the lever plate component to a position in disengagement with the spring-like tongue element for lessening the pressure of said tongue against the wall of the tube.

One advantage of this shut-off valve is the facility with which an intravenous flow to a patient can be instantly discontinued and replaced by another fluid from an alternate supply source suitably manifolded to the same intravenous injection point, such alternate supply being held in readiness and similarly fitted with an adjustable shut-off valve of this invention.

Another advantage of this invention is that movement of fluids flowing past the valve through transparent tubing such as vinyl can be visually monitored.

Still another advantage is that the supply tube against which the cutoff pressure is applied can be readily lifted out of the valve device which is accessible from above and is therefore adapted to receive a replacement by the simple procedure of pressing the substitute tube between the movable clamping spring tongue and the rigid plate which is suitably serrated to hold the tube in position.

Still further advantage resides in this device because tubing can be rapidly mounted therein, dismounted and discarded after use. Transparent elastomeric vinyl tubing is readily available and its low cost is less than that of the cleaning, sterilizing and reassembling tubing circuits of a more permanent design and material.

Figure 2:
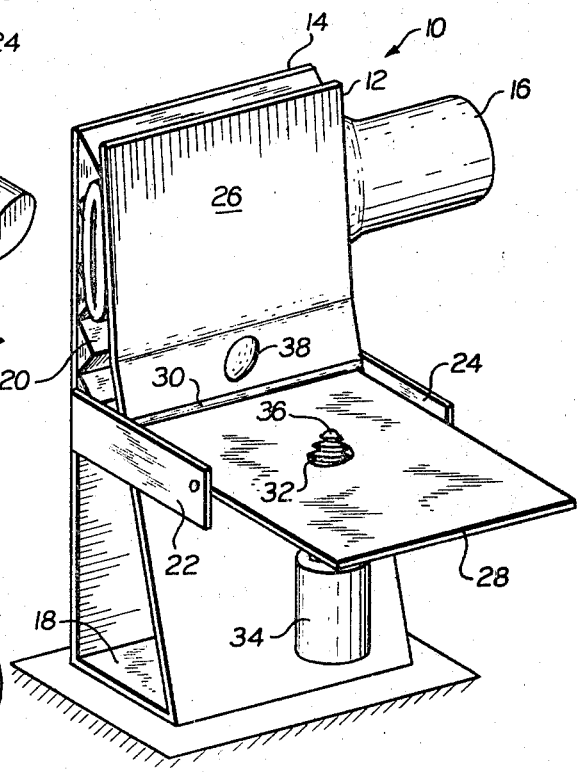
FIGURE 2 is a view similar to FIGURE 1 illustrating the valve in its shut-off position.

Referring to the drawing, the adjustable shut-off valve of the present invention is represented generally by the numeral 10 and includes a pair of clamping members 12 and 14 respectively, for receiving resilient tubing 16 between opposed surface portions thereof. Clamping members 12 and 14 are connected to each other by means of base plate 18 which tends to resiliently displace the clamping members from each other. Clamping member 14 is provided with an inner serrated surface portion 20 to assist in gripping tubing 16 when the clamping members are moved toward each other. Clamping member 14 further includes a pair of spaced brackets 22 and 24 extending beyond the outer surface 26 of clamping member 12 for pivotally mounting plate 28 along opposed side edges thereof; said plate 28 thus constituting abutment means movably related to clamping members 12 and 14. One longitudinally extending edge of plate 28 is provided with a bearing surface 30, such as a roller or the like, or slidably abutting and camming clamping member 12 toward clamping member 14 when plate 28 is pivoted to the position shown in FIGURE 2. Plate 28 further has an opening 32 therein for rotatably and adjustably receiving screw means 34; the forward end 36 of said screw means 34 abutting the outer surface 26 of clamping member 12 when plate 28 is pivoted to a position in opposed relation thereto. Accordingly, screw means 34 constitutes adjustably and rotatably mounted abutment member for adjusting the clamping action of clamping members 12 and 14 in response to rotation of screw means 34 to any selected angular position thereof. A detent 38 is provided in the outer surface 26 of clamping member 12 for engaging and locating the forward end 36 of screw means 34.

Figure 1:
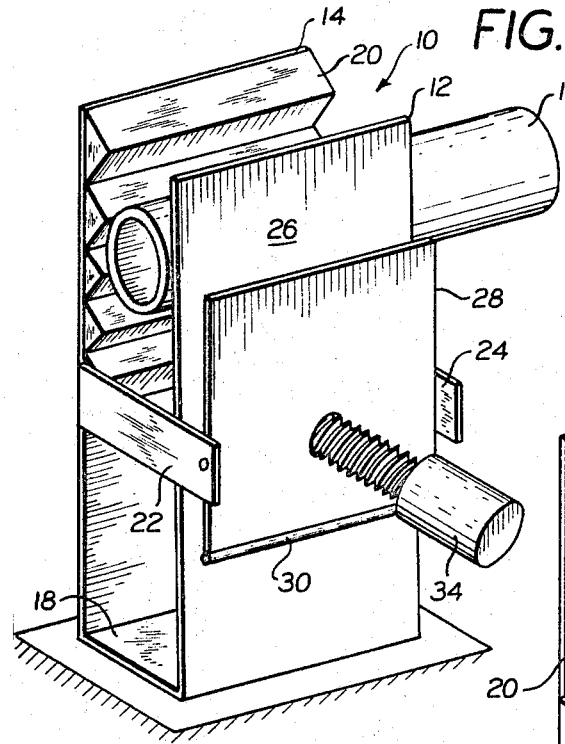
FIGURE 1 is a perspective view of the adjustable shutoff valve constructed in accordance with the present invention, illustrating the valve in its open position.
Figure 3:
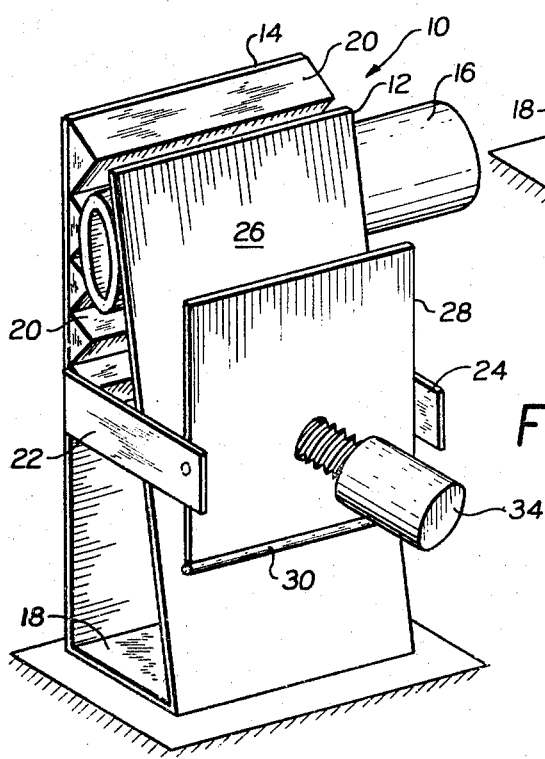
FIGURE 3 is a view similar to FIGURE 1 illustrating the valve in an adjusted, partially open position.

In operating the adjustable shut-off valve of the present invention, plate 28 is pivotally moved to the position shown in FIGURE 1 and screw means 34 is retracted by unscrewing so that tubing 16 may be inserted between clamping members 12 and 14. Screw means 34 is then advanced whereby the forward end 36 thereof will bear against clamping member 12 and move said clamping member toward clamping member 14 thereby compressing and closing tubing 16 between opposed surface portions of said clamping members. The fluid supply may then be turned on at the source. Screw means 34 is then retracted, as shown in FIGURE 3, thereby opening tubing 16 until the desired flow rate is reached. At such time as it is desired to quickly stop the flow of fluid in tubing 16, plate 28 is pivotally moved to the position shown in FIGURE 2 whereby bearing surface 30 will slidably abut clamping member 12 and move said clamping member toward clamping member 14 thereby closing tubing 16 between the opposed surface portions of the clamping members. Fluid flow in tubing 16 is restored by once again pivotally moving plate 28 to the position shown in FIGURE 3, and the desired flow rate is controlled by the selected rotational position of screw means 34.

From the foregoing description it can be seen that this invention provides a convenient means of controlling the flow of fluids, particularly those used intravenously, gradually or abruptly as might be necessary in cases of emergency. Although the valve of this invention has been designed primarily to fill a need for a more accurate control in intravenous technique, it is apparent that this device may be used for other purposes where fluid flow rate must be adjustable from a drip-rate up to a fully open flow. This adjustable shut-off valve is equally efficient when applied to the control of gas flow.

Having described the invention, what is claimed is:

1. An adjustable shut-off valve for selectively controlling the flow rate of a fluid through resilient tubing comprising:
    (a) a pair of clamping members for receiving the tubing between opposed surface portions thereof;
    (b) means tending to resiliently displace the clamping members from each other;
    (c) abutment means movably related to the pair of clamping members and movable between first and second positions thereof;
    (d) said abutment means including a portion slidably abutting an outer surface portion of one of the clamping members while moving toward the first position thereof and simultaneously moving the clamping members toward each other; and in the second position thereof, disengaging the abutting portion from said one of the said clamping members for permitting the clamping members to be displaced from each other; and
    (e) said abutment means further including an abutment member adjustably and rotatably mounted thereon and abutting an outer surface portion of said one of the clamping members for adjusting the clamping action of the clamping members in response to rotation of said abutment member to any selected angular position thereof.

2. An adjustable shut-off valve as recited in claim 1, wherein said abutment means comprises a plate; means extending from the other of said clamping members for pivotally mounting the plate along opposed side edges thereof; said plate having an opening therein; said abutment member comprising screw means rotatably mounted in the plate opening, forward end of the screw means abutting said one of the clamping members when the plate is pivoted to a position in opposed relation thereto.

3. An adjustable shut-off valve as recited in claim 2, further comprising means on the outer surface of said one of the clamping members for engaging and locating the forward end of the screw means.

References Cited

UNITED STATES PATENTS

| | | | |
|---|---|---|---|
| 2,519,909 | 8/1950 | Johnson | 251—10 |
| 2,653,787 | 9/1953 | Myrick | 251—10 |
| 3,204,636 | 9/1965 | Kariher et al. | 251—9 XR |

FOREIGN PATENTS

| | | |
|---|---|---|
| 103,930 | 2/1917 | Great Britain. |

WILLIAM F. O'DEA, Primary Examiner

R. GERARD, Assistant Examiner

U.S. Cl. X.R.

24—125, 134, 258; 269—157, 221